United States Patent
Weller

[11] Patent Number: 5,931,402
[45] Date of Patent: Aug. 3, 1999

[54] BELT WINDER FOR A VEHICLE SAFETY BELT

[75] Inventor: Hermann-Karl Weller, Alfdorf, Germany

[73] Assignee: TRW Occupant Restraint Systems GmbH, Alfdorf, Germany

[21] Appl. No.: 09/031,342

[22] Filed: Feb. 26, 1998

[30] Foreign Application Priority Data

Mar. 18, 1997 [DE] Germany ................. 297 04 974 U

[51] Int. Cl.$^6$ ............... B60R 22/38; B60R 22/34; B60R 22/36

[52] U.S. Cl. .................. 242/383.2; 242/383.4; 242/384.2; 280/806; 280/807

[58] Field of Search ............... 242/383.2, 383.4, 242/384.2; 280/806, 807; 297/478

[56] References Cited

U.S. PATENT DOCUMENTS 5,593,105  1/1997  Schmid et al. ................. 242/383.4

FOREIGN PATENT DOCUMENTS 0638467  2/1995  European Pat. Off. .

Primary Examiner—John Q. Nguyen
Attorney, Agent, or Firm—Tarolli, Sundheim, Covell, Tummino & Szabo

[57] ABSTRACT

A belt winder with a locking toothing and a locking catch provided with at least one locking tooth. The locking catch is able to be moved into the locking toothing in order to lock the belt spool against rotation in a direction of unwinding the safety belt. The belt winder further comprises a control ring rotatable relatively to the belt spool. The control ring is provided with a coupling toothing and engages at the locking catch. The belt winder further comprises a coupling catch rotatably mounted on the belt spool, and a control disc which is non-rotatable relatively to the belt spool and at which an inertial disk is rotatably mounted which on rotation relatively to the control disk brings the coupling catch into engagement with the coupling toothing of the control ring. Thereby, on rotation of the belt spool in the unwinding direction, the control ring is entrained via the coupling catch and the locking catch is engaged into the locking toothing up to a first contact between the locking tooth and the locking toothing. Further, a slot link is provided which couples the locking catch and the control ring such that upon occurrence of the first contact between the locking tooth and the locking toothing, the pivoting movement of the locking catch towards the locking toothing is converted into a rotation of the control ring, which leads the rotation of the belt spool in the unwinding direction.

17 Claims, 3 Drawing Sheets

BELT WINDER FOR A VEHICLE SAFETY BELT

The invention relates to a belt winder for a vehicle safety belt

BACKGROUND OF THE INVENTION

A conventional belt winder, as is known from U.S. Pat. No. 5,593,105, comprises a frame in which a belt spool is rotatably mounted, which is provided with locking toothing, a locking catch provided with at least one locking tooth, which locking catch can be moved into the locking toothing in order to lock the belt spool against a rotation in the unwinding direction of the safety belt, as well as a control ring rotatable relative to the belt spool, which ring is provided with coupling toothing and engages on the locking catch, and a coupling catch rotatably mounted on the belt spool and a control disc which is rotatable relative to the belt spool and on rotation relatively to the belt spool brings the coupling catch into engagement with the coupling toothing of the control ring, whereby on rotation of the belt spool in the unwinding direction, the control ring is entrained via the coupling catch and the locking catch is engaged into the locking toothing up to a first contact between the locking tooth and the locking toothing, from this first contact such a moment of rotation being exerted from the locking toothing onto the locking catch that the locking catch is pivoted completely into the locking toothing.

A belt winder of this type serves to make available a vehicle safety belt for an occupant of a vehicle, in which the safety belt in the normal state is able to be unwound freely from the belt spool against the force of a return spring, whilst in the locked state a belt webbing withdrawal is not possible. The locking can either take place in a manner which is sensitive to the belt webbing, i.e. as a function of accelerations acting on the belt webbing, or in a manner which is sensitive to the vehicle, i.e. as a function of accelerations acting on the vehicle.

In such belt winders, however, an undesired locking of the belt spool can occur. This can happen when the belt webbing, on unwinding from the belt spool or on winding thereon, is suddenly braked or accelerated, for example by arresting an insertion tongue situated on the belt webbing, on a guide of the safety belt or a deflection mounting, with an alteration of the adjustment of a vertically adjustable deflection mounting or at the end of the winding movement when the belt webbing is drawn tight. In such situations, it can happen that the locking of the belt winder is initiated in a manner which is sensitive to the belt webbing. The belt winder then arrives into a state in which the locking mechanism, sensitive to the belt webbing, is activated, whilst at the same time the belt webbing acts upon the belt spool in the unwinding direction. This situation can only be eliminated with increased effort, for example by powerful pulling on the belt webbing, so that a belt webbing slack is produced, and subsequent freeing of the belt webbing, so that the belt spool can rotate under the force of the return spring in the winding direction, whereby the locking mechanism is freed and can return into its position of rest. This situation is further intensified if at the same time as the activation of the locking mechanism, sensitive to the belt webbing, also the locking of the belt winder, sensitive to the vehicle, is initiated, for example by vibrations of the vehicle or by engagement of a back seat rest which is able to be folded and is provided with a belt winder, in its locking mechanism. In this case, the belt winder can arrive into a state in which both the belt webbing-sensitive and also the vehicle-sensitive locking mechanism of the belt winder is tensioned in activated state.

BRIEF DESCRIPTION OF THE INVENTION

The invention provides a belt winder in which after initiation of the locking of the belt spool, the locking mechanism, triggering the locking and responding in a manner sensitive to the belt webbing or sensitive to the vehicle, is freed in a reliable manner. According to the invention, a belt winder for a vehicle safety belt comprises a frame, a belt spool rotatably mounted in the frame and provided with a locking toothing, and a locking catch provided with at least one locking tooth. The locking catch is able to be moved into the locking toothing in order to lock the belt spool against rotation in a direction of unwinding the safety belt. The belt winder further comprises a control ring rotatable relatively to the belt spool. The control ring is provided with a coupling toothing and engages at the locking catch. The belt winder further comprises a coupling catch rotatably mounted on the belt spool, and a control disc which is non-rotatable relatively to the belt spool and at which an inertial disk is rotatably mounted which on rotation relatively to the control disk brings the coupling catch into engagement with the coupling toothing of the control ring. Thereby, on rotation of the belt spool in the unwinding direction, the control ring is entrained via the coupling catch and the locking catch is engaged into the locking toothing up to a first contact between the locking tooth and the locking toothing. This first contact provides such a moment of rotation exerted from the locking toothing onto the locking catch that the locking catch is pivoted completely into the locking toothing. Further, a slot link is provided which couples the locking catch and the control ring such that upon occurrence of the first contact between the locking tooth and the locking toothing, the pivoting movement of the locking catch towards the locking toothing is converted into a rotation of the control ring, which leads the rotation of the belt spool in the unwinding direction. Since the control ring, due to the slot link, leads relatively to the belt spool, the coupling toothing of the control ring detaches itself from the coupling catch, whereby the latter can return into its rest position again. Therefore, the locking mechanism of the belt winder, which is formed substantially by the coupling catch, the coupling toothing associated therewith, the control ring and the control disc, is returned into its position of rest. Therefore, a slight rotation of the belt spool in the winding direction is sufficient to move the locking catch out from the locking toothing of the belt spool, so that the belt spool is freely rotatable again. The invention therefore makes use of the following knowledge: After releasing of the locking mechanism of the belt winder in a manner sensitive to the belt webbing or sensitive to the vehicle, the belt spool must further carry out a rotation about a predetermined angle in the unwinding direction, until the belt spool is completely locked. This angle of rotation is composed of a pilot angle of rotation, which begins with the activation of the locking mechanism and lasts up to the start of pivoting of the locking catch, and of an engagement angle of rotation, during which the locking catch is engaged into the locking toothing of the belt spool. When a conventional belt winder is in the state with a locked belt spool, the belt spool must be rotated both about the engagement angle of rotation and also about the pilot angle of rotation in the winding direction, so that the locking mechanism and hence also again the belt spool is freed again. In a belt winder according to the invention, on the other hand, the belt spool merely has to be turned about the engagement angle of rotation in the winding direction, so that the belt spool is freely rotatable again, because the locking mechanism is already relieved again during the pivoting of the locking catch into the locking toothing.

According to a preferred embodiment of the invention, provision is made that the slot link consists of a pin provided on the locking catch and of a slot provided on the control ring. In this embodiment, a particularly advantageous utilisation of space is produced, because on the control ring more space is available for the slot than on the locking catch.

According to a possible embodiment of the invention, provision is made that the locking catch is provided with a guide groove into which a pin provided on the control ring engages, so that the locking catch by means of the control ring can be engaged into the locking toothing of the belt spool up to a first contact between the locking tooth of the locking catch and the locking toothing. In this embodiment, the slot link is merely used to achieve the leading of the control ring with respect to the belt spool on locking of the belt spool; the engagement of the locking catch into the locking toothing is achieved by means of the guide groove and the pin. This embodiment is advantageous in particular because the guide groove and the pin are already provided with conventional belt winders; the necessary modifications are therefore restricted to a minimum measurement.

According to another possible embodiment of the invention, provision is made that the pin is arranged at the front end of the locking catch, which is at a distance from the rotation axis of the locking catch. In this embodiment, the guide groove and the pin can be dispensed with, by which the locking catch is engaged into the locking toothing. The slot link therefore fulfils both tasks, namely the engagement of the locking catch into the locking toothing and the provision of the leading of the control ring with respect to the belt spool. As the slot, owing to the arrangement of the pin on the locking catch, provides its pivoting movement with a large lever arm, a particularly precise movement of the locking catch is produced.

Advantageous embodiments of the invention will emerge from the sub-claims.

BRIEF DESCRIPTION OF THE DRAWINGS

The invention is described hereinbelow with reference to a preferred embodiment, which is illustrated in the enclosed drawings. In the drawings.

DETAILED DESCRIPTION OF THE INVENTION

Figure 1:
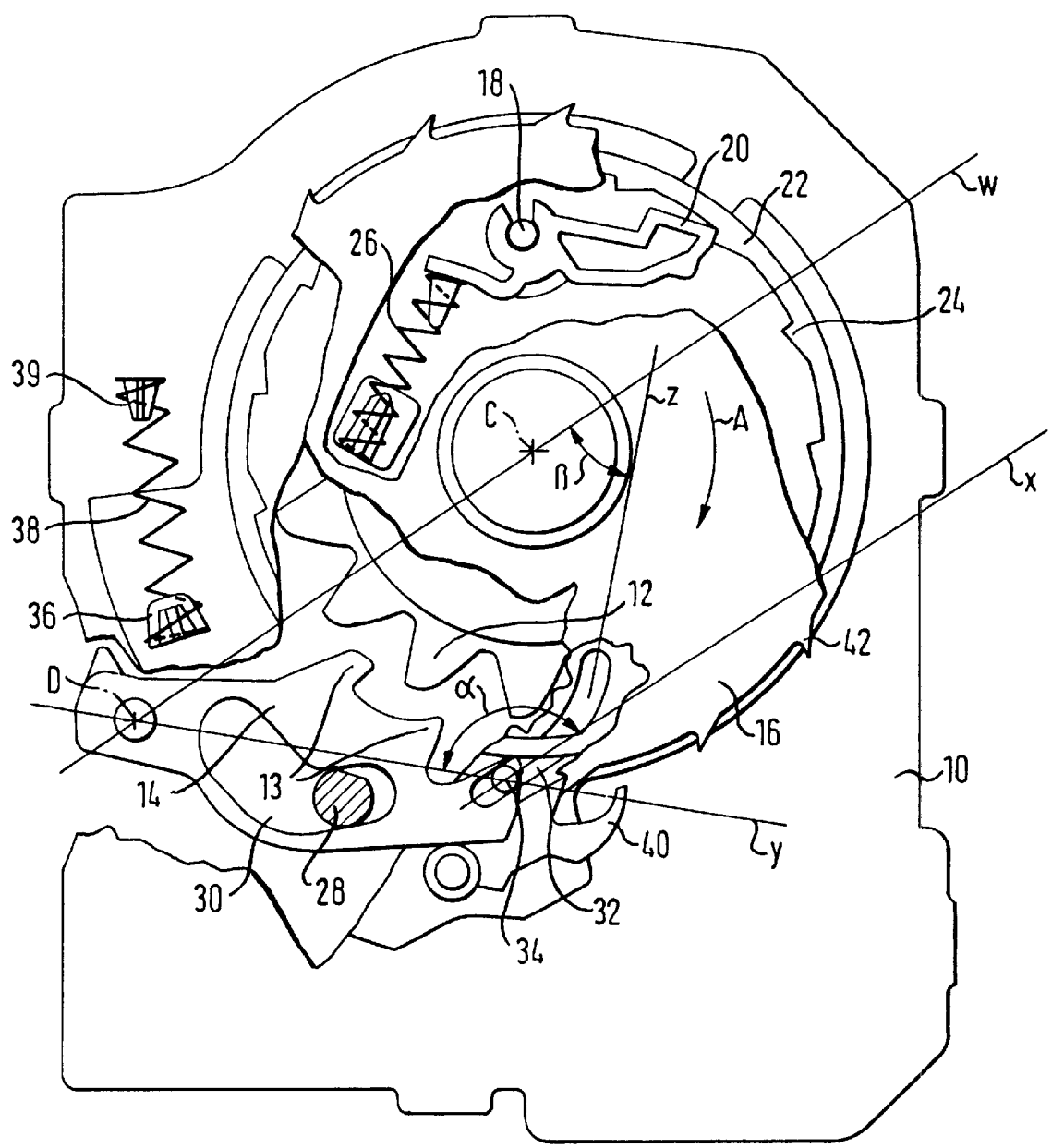
FIG. 1 shows a diagrammatic side view of a belt winder according to the invention, with its locking mechanism in a first state.
Figure 2:
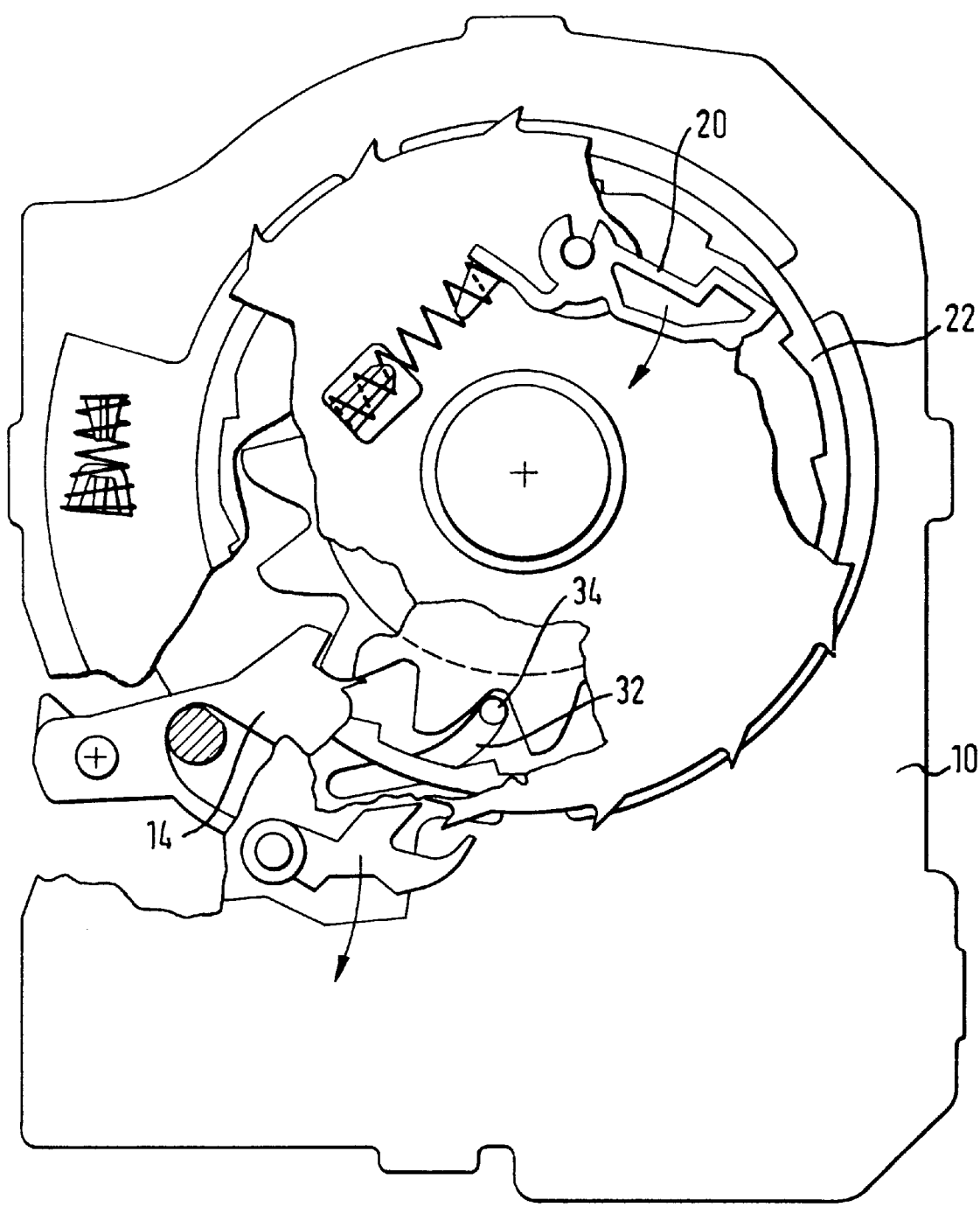
FIG. 2 shows the belt winder of FIG. 1 with the locking mechanism in a second state.

In FIGS. 1 and 2, in a diagrammatic side view, a belt winder according to the invention is illustrated. This consists substantially of a frame 10, in which a belt spool (not illustrated) is rotatably mounted with a rotation axis C. The rotation axis C is perpendicular to the plane of viewing. The belt spool is provided at each axial end with a locking toothing 12, into which a locking catch 14, provided with locking teeth 13, can engage, in order to lock the belt spool against a rotation in the unwinding direction of the safety belt.

Figure 3:
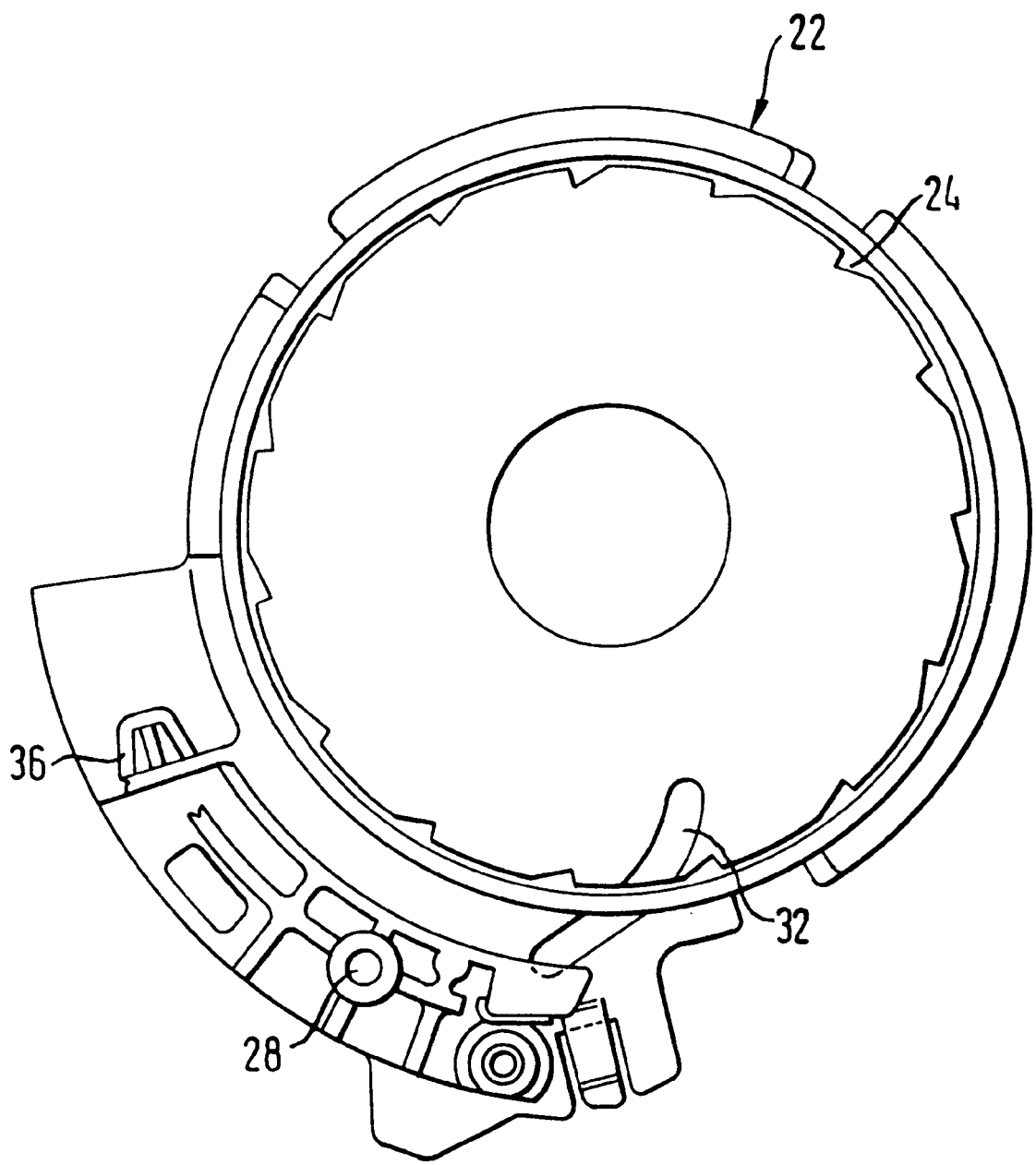
FIG. 3 shows a diagrammatic top view onto a control ring which is used in the belt winder according to the invention in accordance with FIGS. 1 and 2.

The locking catch 14 can be pivoted into the locking toothing 12 by means of a locking mechanism which consists substantially of the following components: a control disc 16, a holding piece 18, a coupling catch 20 and a control ring 22. The control disc 16 is arranged coaxially with and non-rotatably at the belt spool. An inertial disk (not shown in the drawing) is mounted at the control disc 16, the inertial disk being able to rotate relatively to the control disk about a predetermined angle of rotation. The holding piece 18 is connected non-rotatably with the belt spool. On the holding piece, the coupling catch 20 is pivotally mounted, which can be engaged into a coupling toothing 24 of the control ring 22. The coupling catch 20 is biased by a spring 26 into its rest position, in which it does not engage into the coupling toothing 24. The inertial disk engages at the coupling catch 20 such that on rotation of the inertial disk relatively to the control disk 16 and therefor to the holding piece 18, the coupling catch 20 is brought into engagement with the coupling toothing 24 of the control ring 22. The control ring 22 is arranged on the frame 10 so as to be rotatable coaxially to the belt spool. The control ring 22 (see also FIG. 3) is provided with a pin 28 which engages into a guide groove 30 of the locking catch 14. The guide groove 30 has a first section, the width of which corresponds approximately to the diameter of the pin 28, and has a second section, the width of which is greater than the diameter of the pin 28.

The control ring 22 is additionally provided with a slot 32, into which a pin 34 engages which is arranged at the front end of the locking catch 14, which is arranged at a distance from the point of rotation D of the locking catch. The slot 32 consists of a first section which is substantially straight, and of a second section which is curved. The direction of extent of the first section, which is indicated in FIG. 1 by the reference x, forms an angle α with a plane running through the rotation axis D and the pin 34, which plane is indicated by y in FIG. 1, this angle α amounting to between approximately 130° and approximately 150°. Preferably, the angle α amounts to approximately 140°. A tangent, designated by z in FIG. 1, to the end of the second section of the slot 32, facing away from the first section, forms with a plane running through the rotation axis C of the belt spool and the rotation axis D of the locking catch 14, an angle β which amounts to between approximately 30° and approximately 60°. Preferably the angle β amounts to approximately 45°. The first section of the slot 32, in the position of rest of the control ring 22, is aligned approximately parallel to a plane indicated by w in the Figure, which plane runs through the rotation axis C of the belt spool and the rotation axis D of the locking catch 14. The second section of the slot 32 is bent towards the rotation axis C of the belt spool with respect to the direction in which the first section of the slot extends. The curvature of the second section rises proceeding from the transition to the first section. The control ring 22 is also provided with an abutment 36, on which one end of a return spring 38 rests, the other end of which rests on a stop 39 which is fixed to the frame.

The manner of functioning of the belt winder according to the invention is as follows: In the position of rest of the locking mechanism, in which the coupling catch 20 is pivoted in a clockwise direction with respect to the position illustrated in FIG. 1, so that it does not engage into the coupling toothing 24 of the control ring 22, the belt spool can rotate freely in the frame 10. From this state, in a manner sensitive to the belt webbing or sensitive to the vehicle, a locking of the belt spool can be initiated. This begins with a rotation of the control disc 16 relative to the belt spool. This rotation can be brought about by a control catch 40, which from a known (not illustrated) vehicle-sensitive sensor engages into teeth 42 provided on the outer periphery of the control disc 16, so that with a rotation of the belt spool the control disc remains behind this rotation, or through the mass moment of inertia of the control disc itself, owing to which the control disc 16, during an acceleration of rotation of the belt spool, remains behind its rotation. owing to this relative rotation, the coupling catch 20 is brought into engagement with the coupling toothing 24 of the control ring 22. Therefore, the control ring 22 is connected via the coupling catch 20 and the holding piece 18 so as to be non-rotatably for rotations in direction A.

If the belt spool is now rotated in the unwinding direction, i.e. in direction A, the pin 28 engages the locking catch 14 via the guide groove 30 into the locking toothing 12 of the belt spool, until a first contact occurs between the teeth of the locking catch 14 and the locking toothing 12. From this first contact, the locking toothing 12 exerts on the locking catch 14 such a moment of rotation that the locking catch 14 is pivoted completely into the locking toothing 12. In so doing, the pin 28 of the control ring 22 arrives from the first section of the guide groove 30 into the second section, which has a greater width; in this way, the pin 28 comes free of the guide groove 30, so that the locking catch 14 can be pivoted unhindered by the pin 28. At this moment, the pin 34 is situated at the transition between the first section and the second section of the slot 32. With continued rotation of the belt spool and hence further swinging of the locking catch 14 into the locking toothing 12, the pin 34 engages on the inner side of the curved second section of the slot 32 and turns the control ring in the direction of the arrow A. Owing to the special alignment of the slot 32 relative to the rotation axis C, the rotation axis D and the plane y, the pin 34 imparts to the control ring 22, by means of the second section of the slot 32, a rotation which is quicker than the rotation of the belt spool; the control ring 22 therefore precedes the belt spool, as it is now driven via the locking catch 14 and the slot link consisting of the slot 32 and the pin 34, and no longer via the holding piece 18 and the coupling catch 20. As the control ring 22 now leads the belt spool and hence also the holding piece 18 connected non-rotatably therewith, the coupling catch 20 comes free of the coupling toothing 24 of the control ring 22, so that it can return into its position of rest under the action of the spring 26; the locking mechanism is therefore separated from the belt spool. Also the control catch 40, possibly engaging on the control disc 16, can now detach itself from the control disc. The locking mechanism is therefore situated in its inactivated state of rest, although the belt spool is reliably locked against rotations in the unwinding direction. Therefore, a slight rotation of the belt spool in the winding direction is sufficient, i.e. towards the arrow A, in order to release the locking catch 14 from the locking toothing 12. Even if therefore the belt winder were to be in a braced state, in which the belt webbing is tightened and the belt spool is locked, a slight rotation of the belt spool in the winding direction is sufficient in order to release the locking catch from the locking toothing of the belt spool.

According to a further development of the invention, which is not illustrated, provision is made that the locking catch 14 is exclusively engaged into the locking toothing 12 by means of the slot link consisting of the slot 32 and the pin 34; therefore, the pin 28 on the control ring 22 and the guide groove 30 in the locking catch 14 can be dispensed with. As the pin 34 is arranged on the end of the locking catch 14 at a distance from the rotation axis D, the displacement of the locking catch 14 takes place with great accuracy.

According to a further development of the invention, likewise not illustrated, provision is made that the slot 32 is arranged displaceably on the control ring 22. It is also possible that the slot is deformable. This is recommended in particular when there is associated with the belt winder a belt tightener by which in the case of need the so-called belt slack can be eliminated from the safety belt. When the belt spool is rotated in the winding direction for this purpose, the locking catch 14 is pressed out from the locking toothing 12. This is ensured without destroying the locking mechanism in that the slot 32 is arranged so as to be displaceable on the control ring 22.

It is also advantageous in the belt winder according to the invention that the longitudinal direction of the slot extends approximately in the direction of the belt webbing withdrawal from the belt spool. In this way it is prevented that on locking of the belt spool, when the belt spool rests on the frame 10 under a high load, additional mechanical stresses act on the components of the locking mechanism, which usually consist of plastic.

I claim:

1. A belt winder for a vehicle safety belt, comprising a frame, a belt spool rotatably mounted in said frame and provided with a locking toothing, a locking catch provided with at least one locking tooth, said locking catch being adapted to be moved into engagement with said locking toothing in order to lock said belt spool against rotation in a direction of unwinding said safety belt, and further comprising a control ring rotatable relatively to said belt spool, said control ring being provided with a coupling toothing and engaging at said locking catch, a coupling catch rotatably mounted on said belt spool, and a control disc which is non-rotatable relatively to said belt spool and at which an inertial disk is rotatably mounted which on rotation relatively to said control disk brings said coupling catch into engagement with said coupling toothing of said control ring whereby on rotation of said belt spool in said unwinding direction, said control ring is entrained via said coupling catch and said locking catch is engaged into said locking toothing up to a first contact between said locking tooth and said locking toothing, said first contact providing such a moment of rotation exerted from said locking toothing onto said locking catch that said locking catch is pivoted completely into said locking toothing, a slot link being provided which couples said locking catch and said control ring such that upon occurrence of said first contact between said locking tooth and said locking toothing, the pivoting movement of said locking catch towards said locking toothing is converted into a rotation of said control ring, which rotation leads the rotation of said belt spool in said unwinding direction whereby engagement of said coupling catch with said coupling toothing is released.

2. The belt winder of claim 1, wherein said locking catch is provided with a guide groove, into which a pin provided on said control ring engages so that said locking catch by means of said control ring can be engaged into said locking toothing of said belt spool up to said first contact between said locking tooth of said locking catch and said locking toothing.

3. The belt winder of claim 2, wherein said guide groove comes free of said pin after said first contact between said locking tooth of said locking catch and said locking toothing of said belt spool.

4. The belt winder of claim 3, wherein said guide groove has at least partially a width which is greater than the diameter of said pin.

5. The belt winder of claim 1, wherein said slot link consists of a pin provided on said locking catch and of a slot provided on said control ring.

6. The belt winder of claim 2, wherein said pin is arranged at a front end of said locking catch, which is at a distance from the rotation axis of said locking catch.

7. The belt winder of claim 2, wherein said slot is deformable.

8. The belt winder of claim 2, wherein said slot is arranged so as to be elastically displaceable on said control ring.

9. The belt winder of claim 2, wherein said control ring is rotatable concentrically to the rotation axis of said belt spool and wherein a first section of said slot, which on rotation of said control ring engages said locking catch into said locking toothing up to said first contact with the latter, is aligned in a rest position of said control ring approximately parallel to a plane running through the rotation axis of said belt spool and the rotation axis of said locking catch.

10. The belt winder of claim 9, wherein the direction of extent of said first section of said slot and a plane running through the rotation point of said locking catch and said pin form an angle between approximately 130° and approximately 150°.

11. The belt winder of claim 10, wherein the angle formed by the direction of extent of said first section and said plane running through the rotation point of said locking catch and said pin, amounts to approximately 140°.

12. The belt winder of claims 9, wherein a second section of said slot, which converts the pivoting movement following said engagement movement of said locking catch into a rotation of said control ring, is curved, with respect to the direction in which said first section extends, towards said rotation axis of said belt spool.

13. The belt winder of claim 12, wherein the curvature of said second section rises, proceeding from a transition to said first section.

14. The belt winder of claim 12, wherein a tangent to said end of said second section of said slot, facing away from said first section, forms an angle between approximately 30° and approximately 60° with a plane running through said rotation axis of said belt spool and said rotation axis of said locking catch.

15. The belt winder of claim 14, wherein an angle formed by said tangent to said end of said second section of said slot, facing away from said first section, with said plane running through said rotation axis of said belt spool and said rotation axis of said locking catch amounts to approximately 45°.

16. The belt winder of claim 2, wherein said pin is formed integrally with said locking catch.

17. The belt winder of claim 2, wherein the longitudinal direction of said slot extends approximately in the direction of belt webbing withdrawal from said belt spool.

* * * * *